(12) United States Patent
Otsuki et al.

(10) Patent No.: US 11,481,307 B2
(45) Date of Patent: Oct. 25, 2022

(54) CALL STACK ACQUISITION DEVICE, CALL STACK ACQUISITION METHOD AND CALL STACK ACQUISITION PROGRAM

(71) Applicant: NIPPON TELEGRAPH AND TELEPHONE CORPORATION, Tokyo (JP)

(72) Inventors: Yuto Otsuki, Musashino (JP); Yuhei Kawakoya, Musashino (JP); Makoto Iwamura, Musashino (JP); Takeo Hariu, Musashino (JP); Takeshi Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/643,588

(22) PCT Filed: Jun. 28, 2018

(86) PCT No.: PCT/JP2018/024533
§ 371 (c)(1),
(2) Date: Mar. 2, 2020

(87) PCT Pub. No.: WO2019/049478
PCT Pub. Date: Mar. 14, 2019

(65) Prior Publication Data
US 2020/0242002 A1    Jul. 30, 2020

(30) Foreign Application Priority Data

Sep. 6, 2017 (JP) .............................. JP2017-171393

(51) Int. Cl.
*G06F 9/44*    (2018.01)
*G06F 11/34*   (2006.01)
(Continued)

(52) U.S. Cl.
CPC ...... *G06F 11/3471* (2013.01); *G06F 11/3636* (2013.01); *G06F 21/566* (2013.01); *G06F 2221/033* (2013.01)

(58) Field of Classification Search
CPC ............. G06F 11/0715; G06F 11/0766; G06F 11/366; G06F 11/3471; G06F 11/3636; G06F 11/0778; G06F 9/4484
See application file for complete search history.

(56) References Cited

U.S. PATENT DOCUMENTS

2004/0083460 A1    4/2004  Pierce
2004/0148594 A1*   7/2004  Williams .............. G06F 9/4484
                                          712/E9.082
(Continued)

OTHER PUBLICATIONS

International Search Report and Written Opinion dated Sep. 4, 2018 for PCT/JP2018/024533 filed on Jun. 28, 2018, 8 pages including English Translation of the International Search Report.
(Continued)

*Primary Examiner* — Tuan A Vu
(74) *Attorney, Agent, or Firm* — Xsensus LLP

(57) ABSTRACT

For the purpose of reproducing a call stack accurately without restricting the range of application, a stack scanner extracts, from a stack area of a thread whose call stack is to be acquired in a memory space of an application process, possible return addresses that are addresses in a feasible region in the memory space each representing a command right after a function call command. A program analyzer analyzes a control flow representing a flow of control configured by a branch in a function that is called by the function call command right before the command represented by each of the possible return addresses and, when there is a route reaching a command currently being executed in the control flow, determines that the possible
(Continued)

return address is a return address and, when there is not the route, determines that the possible return address is not a return address.

6 Claims, 7 Drawing Sheets

(51) Int. Cl.
*G06F 11/36* (2006.01)
*G06F 21/56* (2013.01)

(56) References Cited

U.S. PATENT DOCUMENTS

| | | |
|---|---|---|
| 2009/0217006 A1 | 8/2009 | Pedersen |
| 2010/0251219 A1* | 9/2010 | Peacock .............. G06F 11/3636 717/128 |
| 2012/0297370 A1* | 11/2012 | Sale ...................... G06F 11/366 717/128 |
| 2013/0262936 A1* | 10/2013 | Elliott ................ G06F 11/0766 714/45 |
| 2015/0261596 A1* | 9/2015 | Muthukumsarasamy .................. G06F 11/0715 714/57 |
| 2017/0185775 A1 | 6/2017 | Boehm et al. |
| 2018/0024876 A1* | 1/2018 | Addison ............. G06F 11/0778 714/45 |

OTHER PUBLICATIONS

Arasteh, A.R., and Debbabi, M., "Forensic Memory Analysis: From Stack and Code to Execution History," Digital Investigation: The International Journal of Digital Forensics & Incident Response, vol. 4, Elsevier Ltd., Sep. 2007, pp. S114-S125.

Davi, L., et al., "ROPdefender: A Detection Tool to Defend Against Return-Oriented Programming Attacks," Proceedings of the 6th ACM Symposium on Information, Computer and Communications Security, Hong Kong, China, Mar. 22-24, 2011, pp. 40-51.

Hejazi, S.H., et al., "Extraction of Forensically Sensitive Information from Windows Physical Memory," Digital Investigation: The International Journal of Digital Forensics & Incident Response, vol. 6, Elsevier Ltd., Sep. 2009, pp. S121-S131.

* cited by examiner

CALL STACK ACQUISITION DEVICE, CALL STACK ACQUISITION METHOD AND CALL STACK ACQUISITION PROGRAM

CROSS-REFERENCE TO RELATED APPLICATIONS

The present application is based on PCT filing PCT/JP2018/024533, filed Jun. 28, 2018, which claims priority to JP 2017-171393, filed Sep. 6, 2017, the entire contents of each are incorporated herein by reference.

FIELD

The present invention relates to a call stack acquisition device, a call stack acquisition method, and a call stack acquisition program.

BACKGROUND

With spread of computers and the Internet, cyber-attacks are becoming more sophisticated and diversified. Targeted attacks targeting specific organizations often use unknown computer viruses (malware) and thus is difficult to prevent cyber-attacks in advance. For this reason, it is required to speedily take actions to specify the cause and minimize damages after the attack.

Techniques taken in incident responses where such actions are taken include memory analysis on an attacked terminal that is referred to as memory forensics. A computer operates while saving commands (codes) to be executed and data to be used in a memory. The memory thus contains the execution status (operating status) at that moment, such as the status of the application that was running, the opened file, the resources, such as the registry, the code that was being executed and data that was read and written, the communication partners and the transmitted and received data. Thus, by analyzing the data remaining in the memory, it is possible to know what was happening at that moment.

With the existing memory forensic techniques, however, it is difficult to specifically know how the individual running application was running. There is, as a method to know the operating status of the application, for example, a technique referred to as stack tracing that is used for debugging a program, or the like. Each of threads that execute an application has a data area referred to as a stack and, each time a function is called, an address (return address) representing a caller is stacked in the stack. The return address that is stacked in the stack is used to return to the caller function to end the process of the called function and then is discarded.

Stack tracing analyzes the structure of the stack and acquires the stored return addresses to clarify the nesting condition of function calls, that is, the call stack, at that moment. Thus, when, for each thread that was executing the application, a result equivalent to a stack trace is acquired from a memory dump, it is assumed that the operating status of the application can be known.

General stack tracing acquires a return address by tracing frame pointers (or base pointers) that are saved in the stack and reproduces a call stack. The frame pointer represents, independently of a stack pointer representing the top of the stack, a data area in the stack that is used by a function currently being executed. A general function stacks the value of the frame pointer that was originally used by the caller in the stack and sets the position of the value as the frame pointer of the function.

Specifically, in the stack, there is the value of the frame pointer that was used by the caller function in the position that is represented by the frame pointer and a return address representing the caller is stored in the previous entry. It is thus possible to acquire return addresses in the stack by repeating acquisition of the value of a previous frame pointer and a return address.

As described above, a general stack trace technique is realized in a way that each function utilizes reference to its own data area using a frame pointer. On the other hand, a frame pointer is not essential to execute a function. There is an executable file without use of frame pointers because of optimization of a compiler. There is also an executable file like 64 bit Windows (trademark) that uses no frame pointer over the execution environment. When no frame pointer is used, it is not possible to acquire a return address by tracing a frame pointer in the stack as described above and thus it is not possible to reproduce a call stack.

A technique for reproducing a call stack containing a function call using no frame pointer is known. For example, a general debugger enables reproduction of a call stack by utilizing debug symbols in a target program. Monitoring operations being executed enables reproduction of a call stack containing a function call using no frame pointer (refer to Non Patent Literature 1). Scanning return addresses in the stack enables reproduction of a call stack containing a function call using no frame pointer (Non Patent Literatures 2 and 3).

CITATION LIST

Patent Literature

Non Patent Literature 1: L. Davi, A. R. Sadeghi, M. Winandy, "ROPdefender: A Detection Tool to Defend Against Return-Oriented Programming Attacks", Proceedings of the 6th ACM Symposium on Information, Computer and Communications Security, ASIACCS' 11, ACM, pp. 40-51, 2011

Non Patent Literature 2: S. M. Hejazi, et al., "Extraction of Forensically Sensitive Information from Windows Physical Memory", Digital Investigation 6, Supplement, S121-S131, 2009

Non Patent Literature 3: A. R. Arasteh, M. Debbabi, "Forensic Memory Analysis: From Stack and Code to Execution History", Digital Investigation 4, Supplement, S114-S125, 2007

SUMMARY

Technical Problem

The conventional techniques however may be unable to reproduce accurate reproduction of a call stack containing a function call using no frame pointer. For example, the technique for reproducing a call stack by utilizing debug symbols has a range of its application limited to programs capable of acquiring debug symbols and therefore is not applicable to analysis on legitimate programs from which symbols are removed in association with the release and malignant programs, such as malware.

The technique which reproduces a call stack by monitoring an operation being executed can apply only to a program which is monitored in the environment where a monitoring program has been introduced, because of the necessity to monitor the operation during its execution.

The technique for reproducing a call stack containing a function call using no frame pointer by scanning a return address in a stack has a risk that a function pointer that is not a return address may be detected by error. In other words, the technique detects, as a return address, a value among the values contained in a stack area that can be translated as an address in a feasible region and right after a function call command (call command). A function pointer that is not a return address may meet the above-described condition and thus there is a risk that the function pointer is detected as a return address by error. Also when a value that was used as a return address in the past remains without being overwritten, the value may be detected as a return address by error.

The present invention was made in view of the above-described circumstances and an object of the invention is to reproduce a call stack accurately without restricting the range of application.

Solution to Problem

To solve the above-described problem and to achieve an object, a call stack acquisition device according to the present invention is a call stack acquisition device which acquires, from a memory of a computer or a memory dump in which a status of the memory is saved, a call stack of a thread that is executing an application process running on the computer, and includes an extractor configured to extract, from a stack area of the thread whose call stack is to be acquired in a memory space of the application process, possible return addresses in a feasible region in the memory space each representing a command right after a function call command, and an analyzer configured to analyze a control flow representing a flow of control configured by a branch in a function that is called by the function call command right before the command represented by each of the possible return addresses and, when there is a route reaching a command currently being executed in the control flow, determine that the possible return address is a return address and, when there is not the route, determine that the possible return address is not the return address.

Advantageous Effects of Invention

According to the present invention, it is possible to reproduce a call stack accurately without restricting the range of application.

DESCRIPTION OF EMBODIMENTS

With reference to the drawings, an embodiment of the present invention will be described in detail below.

The embodiment does not limit the invention. In the illustration of the drawings, the same components are denoted with the same signs and represented.

Configuration of Call Stack Acquisition Device

Figure 1:
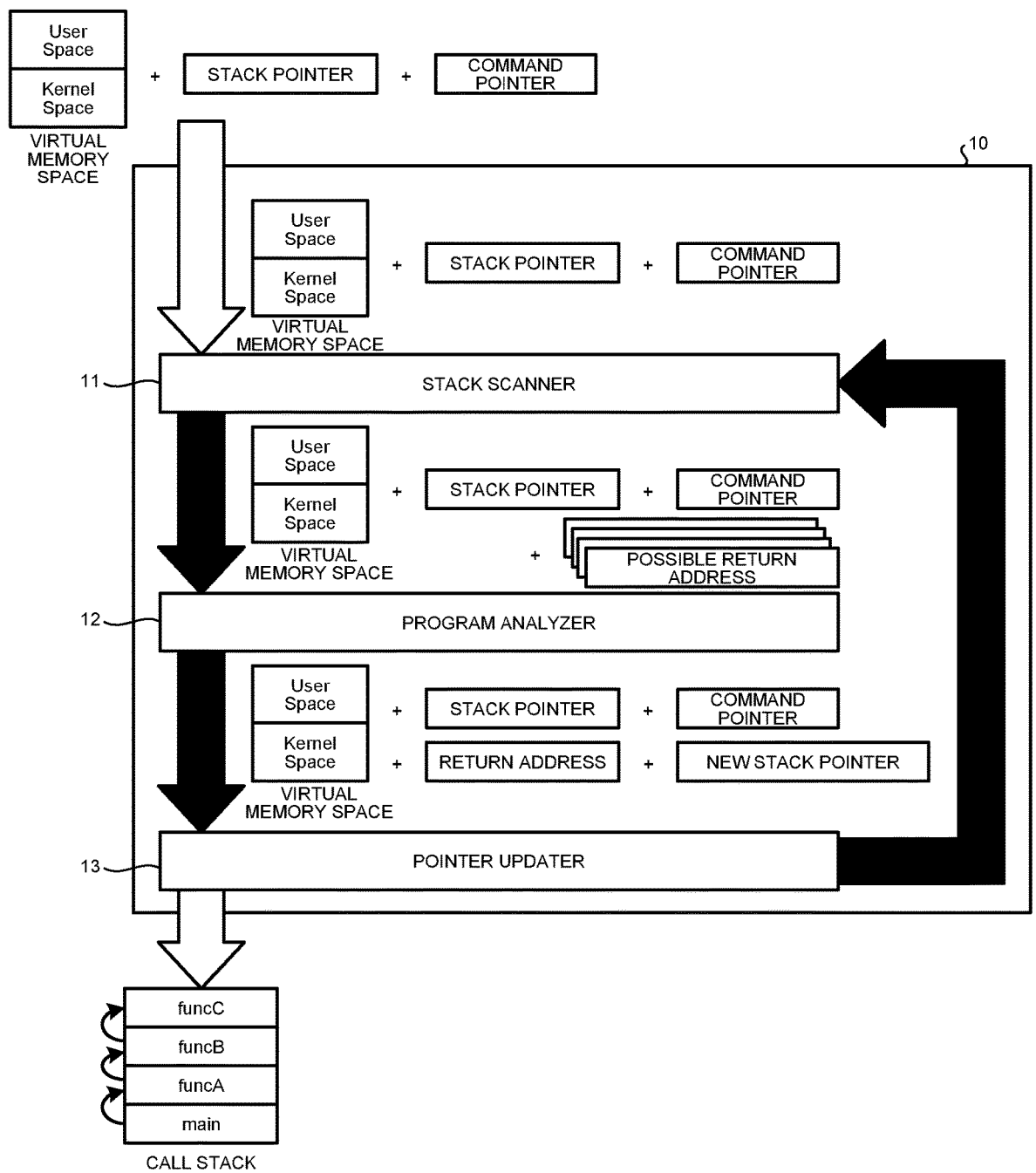
FIG. 1 is a schematic diagram exemplifying a schematic configuration of a call stack acquisition device.

FIG. 1 is a schematic diagram exemplifying a schematic configuration of a call stack acquisition device. A call stack acquisition device 10 acquires, from a memory of a computer or a memory dump in which the status of the memory is saved, a call stack of a thread that is executing an application process running on the computer. A program that runs on an x64 architecture processor is described below; however, the architecture of a central processing unit (CPU), the OS environment, etc., are not particularly limited.

The call stack acquisition device 10 is implemented using a general-purpose computer, such as a personal computer, and a controller that is implemented using a CPU, or the like, executes a processing program that is stored in a memory and accordingly, as illustrated in FIG. 1, functions as a stack scanner 11, a program analyzer 12 and a pointer updater 13. The function units may be implemented in different sets of hardware.

The stack scanner 11 functions as an extractor. In other words, the stack scanner 11 extracts, from a stack area of a thread whose call stack is to be acquired in a memory space of an application process, a possible return address that is an address in a feasible region in the memory space representing a command right after a function call command.

Specifically, first of all, the stack scanner 11 receives, as an input, a virtual memory space in which the thread whose call stack is to be created runs and specifies a stack area. The stack scanner 11 receives a stack pointer as an input and, using the stack pointer, specifies a stack area.

The virtual memory space is not limited to a live memory of a running computer, and a memory dump enabling reproduction of the virtual memory space may be used. For example, a physical memory dump, a virtual memory dump, status saving data that is created when the computer is idle, suspend data of a virtual computer, a snapshot, or the like, may be used.

The stack scanner 11 specifies a continuous area of a secured memory area as the stack area from the stack pointer. The method of specifying a stack area is not limited thereto. For example, when an OS, or the like, manages the area of the call stack, the stack area may be specified from the data structure. The area of the stack area may be specified by receiving specifying of an address representing the bottom of the stack by a user in addition to the stack pointer.

Figure 2:
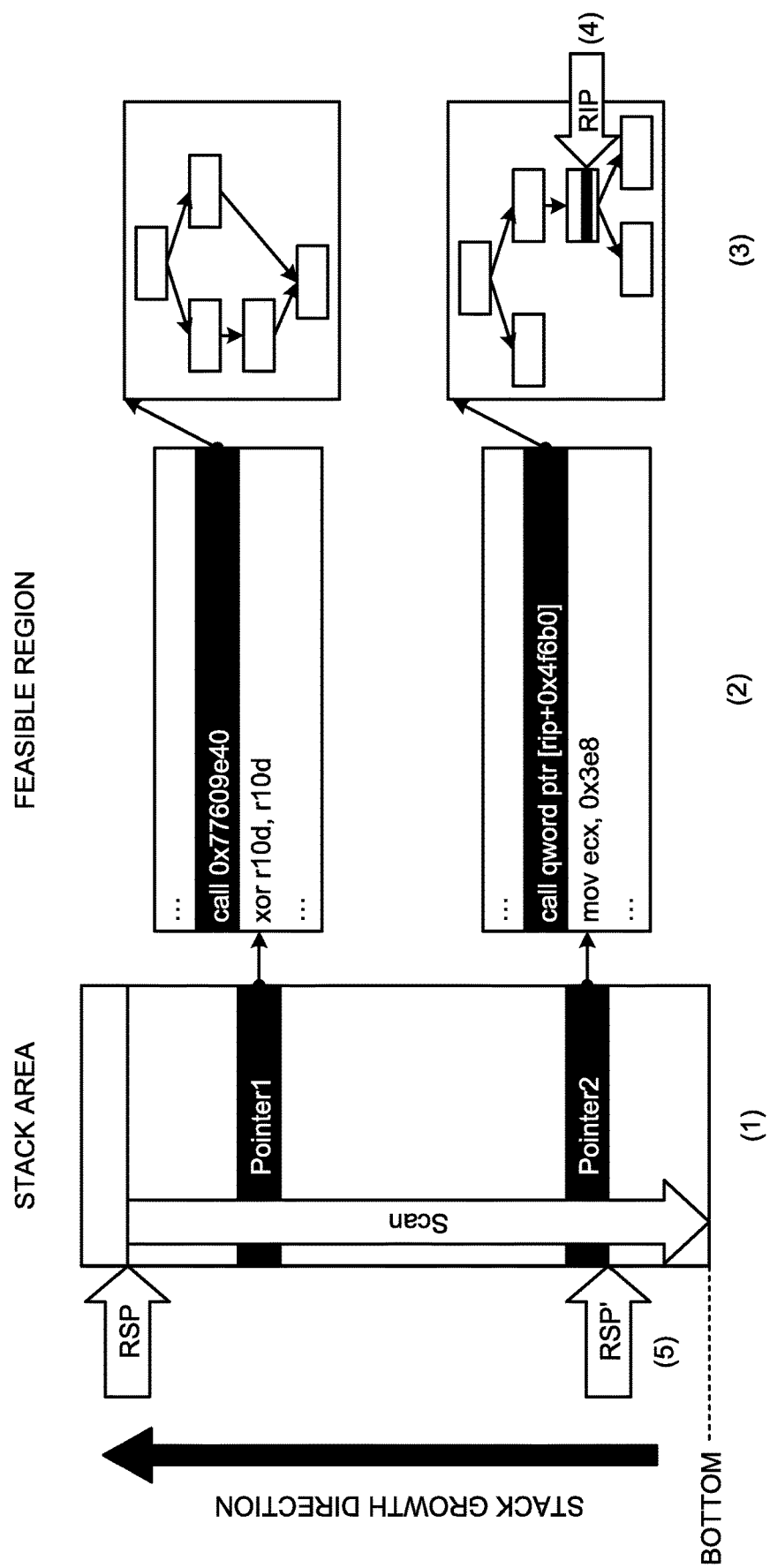
FIG. 2 is an explanatory view for explaining an overview of a process performed by the call stack acquisition device.

With reference to FIG. 2, a process performed by the stack scanner 11 will be described. FIG. 2 is an explanatory view for explaining an overview of the process performed by the call stack acquisition device 10. FIG. 2(1) exemplifies the stack area of the thread. FIG. 2(2) exemplifies part of the feasible region in the memory space where the thread operates.

As exemplified in FIG. 2(1), the stack scanner 11 scans the stack area that is specified using a stack pointer RSP and extracts a value serving as a possible return address. The stack scanner 11 extracts, as the possible return address, a value representing an address in the feasible region in the virtual memory space representing a command right after a call command exemplified in FIG. 2(2). In the example illustrated in FIG. 2, Pointer1 and Pointer2 are extracted as possible return addresses.

The program analyzer 12 functions as an analyzer. In other words, the program analyzer 12 analyzes control flows representing flows of control that are configured by branches in functions that are called by function call commands right before the commands represented respectively by the return addresses. When there is a route reaching the command currently being executed in the control flow, the program analyzer 12 determines that the possible return address is a return address and, when there is not the route, the program analyzer 12 determines that the possible return address is not the return address.

Specifically, first of all, the program analyzer 12 selects, from the possible return addresses, a possible address in an ascending order in which the possible address is close to the stack pointer RSP representing the top of the stack area. The program analyzer 12 then analyzes, for the function that is called by the call command right before the command represented by the selected possible return address, the control flow representing the flow of control that is configured by the branch.

In the example illustrated in FIG. 2, first of all, Pointer1 is selected and, for a function in an address area that is called by a call command right before the command represented by Pointer1 as illustrated in FIG. 2(2), a control flow graph obtained by graphing a relationship between a branch source and branch targets of the branch command as exemplified in FIG. 2(3).

Using the created control flow graph, the program analyzer 12 examines whether there is a route reaching the command currently being executed. The program analyzer 12 receives a command pointer RIP representing the command currently being executed as an input and thus, using the command pointer RIP, specifies the command currently being executed. The command currently being executed means the last command that the thread was executing before the call stack acquisition process. The specifying is not limited to specifying using a command pointer, and the program analyzer 12 may specify a command currently being executed using a data structure representing the execution context.

FIG. 2 illustrates that, as a result of analysis of and examination on the control flow of the function that is called by the call command right before the command represented by Pointer1, there no route reaching the command currently being executed. In this case, the program analyzer 12 determines that Pointer1 that is a possible return address is not a return address. For example, the case where a value that was used as a return address in the past remains without being overwritten, or the like, is supposed.

The program analyzer 12 then selects a possible return address that is next close to the stack pointer RSP and repeats the above-described process. In the example illustrated in FIG. 2, Pointer2 is selected and the above-described process is repeated. In other words, for a function in the address area that is called by a call command right before the command represented by Pointer2 as illustrated in FIG. 2(2), a control flow graph is created as exemplified in FIG. 2(3).

FIG. 2(4) represents that, as a result of examination on the created control flow graph, there is a route reaching the command currently being executed that is represented by the command pointer RIP. This means that it is established that the function containing the command represented by the possible return address is a caller of the function currently being executed. In this case, the program analyzer 12 determines that Pointer2 that is a possible return address is a return address.

The program analyzer 12 may determine an appropriate return address from possible return addresses by analyzing the entire control flow of the program being executed, particularly, a call flow in the control flow representing the flow of the function call and the relationship and thus acquiring the relationship between functions.

Alternatively, the program analyzer 12 may apply a method of emulation execution and symbolic execution to part or whole the determined return address and a command that is present ahead the extracted possible return address. This enables reproduction of the status where the function being executed ends and accurate determination of a return address.

The pointer updater 13 functions as an updater. In other words, when the program analyzer 12 determines that a possible return address is a return address, the pointer updater 13 makes updates such that the position right after the position where there is the possible return address that is determined as the return address is the top position of the stack area and such that the address that is determined as the return address is the position of the command currently being executed.

Specifically, when the program analyzer 12 determines that the possible return address is a return address, the pointer updater 13 updates the stack pointer RSP to a position in the stack area right after the position where there is the possible return address that is determined as the return address and updates the command pointer RIP to the value of the address that is determined as the return address.

In the example illustrated in FIG. 2, as illustrated in FIG. 2(5), the stack pointer is updated to RSP' and the value of the command pointer RIP is updated to the value of Pointer2. Thereafter, the call stack acquisition device 10 then repeats the above-described process.

Thus, when the relationship between the called and the caller is established between the already determined return address and the possible return address, it is determined that the possible return address is a return address that should be acquired next. Accordingly, the return address is determined in an ascending order in which the return address is close to the stack pointer RSP representing the top of the stack area. In this case, the relationship between the caller and the called is established between return addresses successive in the call stack.

Thereafter, when the updated stack pointer reaches the bottom of the call stack, the call stack acquisition device 10 outputs the call stack formed of the return addresses having been determined to, for example, a display or an external management device.

Call Stack Acquisition Process

Figure 3:
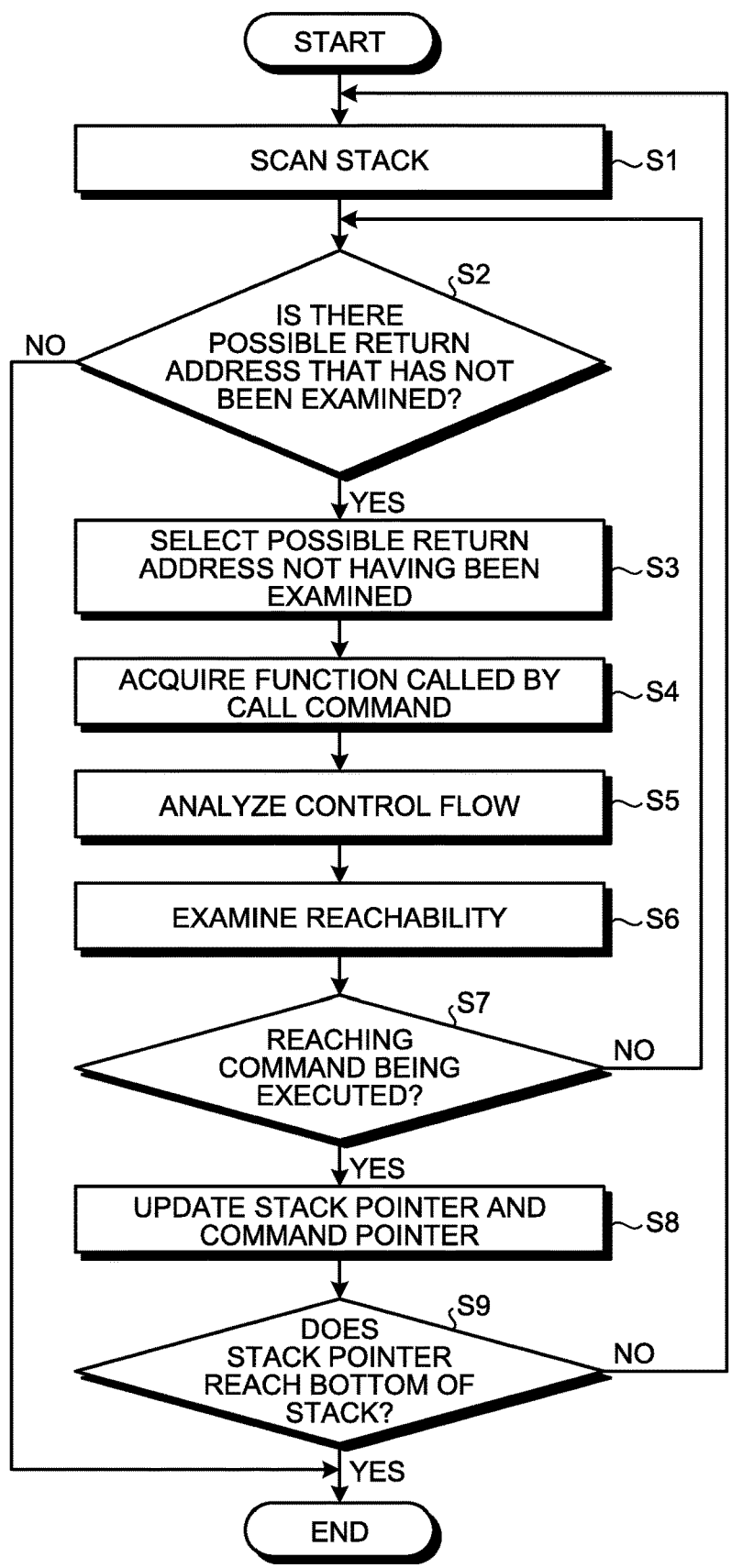
FIG. 3 is a flowchart exemplifying a procedure of the call stack acquisition process.
Figure 4:
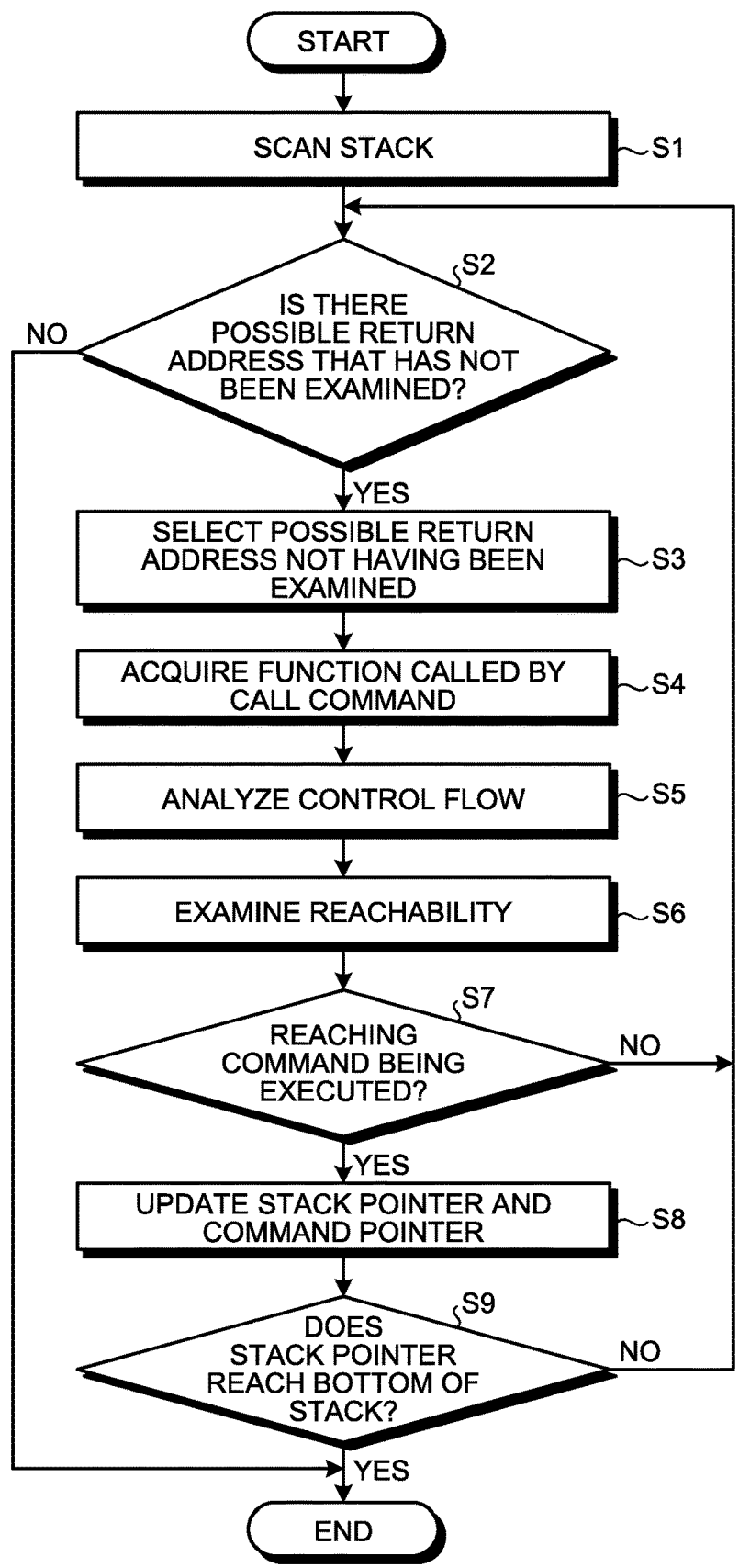
FIG. 4 is a flowchart exemplifying a procedure of the call stack acquisition process.
Figure 5:
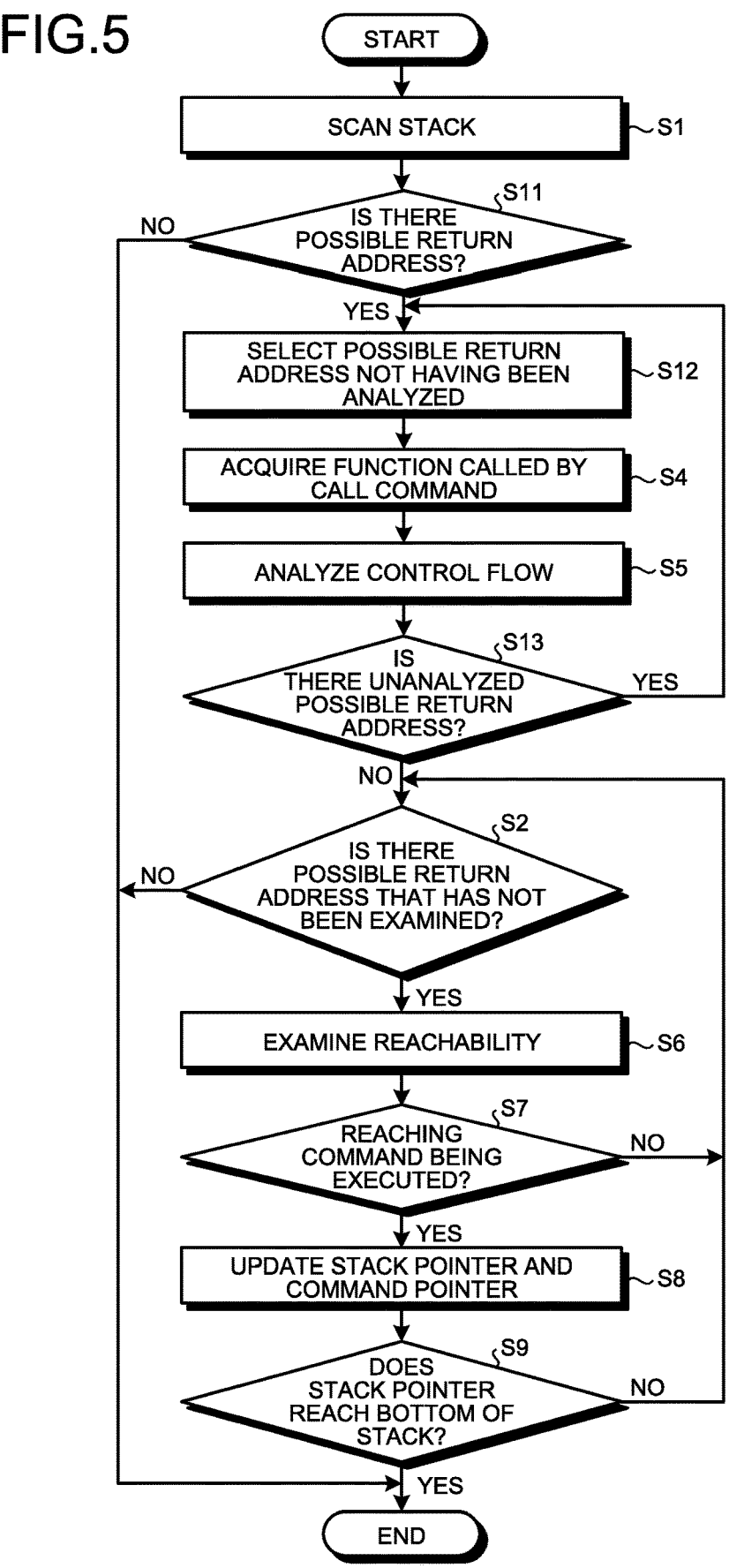
FIG. 5 is a flowchart exemplifying a procedure of the call stack acquisition process.

With reference to FIGS. 3 to 5, the call stack acquisition process performed by the call stack acquisition device 10 according to the embodiment will be described. FIG. 3 is a flowchart exemplifying a procedure of the call stack acquisition process. The flowchart of FIG. 3 is started, for example, at the timing when an operator performs an input operation to issue an instruction to start the call stack acquisition process.

First of all, the stack scanner 11 scans a stack area that is specified using a stack pointer RSP and extracts a possible return address (step S1). The program analyzer 12 then checks whether there is a possible return address that has not been examined (step S2) and, when there is no unexamined possible return address (step S2, No), ends the call stack acquisition process sequence.

On the other hands, when there is an unexamined possible return address (step S2, Yes), the program analyzer 12 selects the possible return address as a possible return address to be examined (step S3). The program analyzer 12 acquires a function that is called by a call command right before the command represented by the possible return address (step S4) and analyzes a control flow of the function (step S5).

In other words, the program analyzer 12 examines whether there is a route reaching a command currently being executed (step S6). When there is no route reaching the command currently being executed (step S7, No), the program analyzer 12 determines that the possible return address is not a return address and returns the process to step S2. On the other hand, when there is a route reaching the command currently being executed (step S7, Yes), the program analyzer 12 determines that the possible return address is a return address and brings the process forward to step S8.

In the process at step S8, the pointer updater 13 updates the stack pointer RSP to a position in the stack area right after the position where there is the possible return address that is determined as the return address and updates the command pointer RIP to a value of an address that is determined as the return address. The pointer updater 13 checks whether the updated stack pointer has reached the bottom of the call stack (step S9) and, when the updated stack pointer has not reached the bottom of the call stack (step S9, No), returns the process to step S1. In other words, after the stack scanner 11 specifies a stack area using the updated stack pointer RSP', scans the stack area, and extracts a possible return address, the above-described process is repeated.

On the other hand, when the updated stack pointer has reached the bottom of the call stack (step S9, Yes), the pointer updater 13 ends the call stack acquisition process sequence.

FIG. 4 is also a flowchart exemplifying the call stack acquisition process procedure. The procedure has a difference from the process of FIG. 3 only in the processing at step S9. In other words, the pointer updater 13 checks whether the updated stack pointer has reached the bottom of the call stack (step S9) and, when the updated stack pointer has not reached the bottom of the call stack (step S9, No), returns the process to step S2.

In this case, using the possible return address resulting from scanning the stack area that is specified using the stack pointer before the update, the process at and after step S2 is repeated. Thus, compared to the process of FIG. 3, the process load corresponding to only the processing at step S1 is reduced. Note that the remaining process is the same as the process in FIG. 3 and thus description thereof will be omitted.

FIG. 5 is also a flowchart exemplifying the call stack acquisition process procedure. The procedure has a different process order from the process of FIG. 4. In other words, for each of possible return addresses that are extracted by the stack scanner 11, first of all, the program analyzer 12 acquires a function that is called by a call command right before the command represented by the possible return address (step S4) and analyzes a control flow of the function (step S5). Thereafter, for each of the possible return addresses, an examination on whether there is a route reach a command currently being executed is performed (step S6) and updates of the stack pointer RSP and the command pointer RIP in the case where there is the route (step S7, Yes) are made. In this manner, analysis of the control flows and examination on whether there is a route reaching the command currently being executed are separated and reuse the analyzed control flows is enabled, which enables an efficient process.

Specifically, after the stack scanner 11 scans a stack area that is specified using a stack pointer RSP and extracts possible return addresses (step S1), the program analyzer 12 checks whether there is a possible return address (step S11). When there is no possible return address (step S11, No), the program analyzer 12 ends the call stack acquisition process sequence.

On the other hand, when there is a possible return address (step S11, YES), the program analyzer 12 selects the possible return address as a possible return address to be analyzed (step S12). The program analyzer 12 acquires a function that is called by a call command right before a command that is represented by the possible return address (step S4) and analyzes a control flow of the function (step S5).

Thereafter, the program analyzer 12 checks the control flow on whether there is a possible return address that has not been analyzed (step S13) and, when there is an unanalyzed possible return address (YES at step S13), returns the process to step S12 and analyzes the control flow.

On the other hand, when there is no unanalyzed possible return address (step S13, No), the program analyzer 12 checks whether there is a possible return address that has not been examined (step S2). When there is no possible unexamined return address (step S2, No), the program analyzer 12 ends the call stack acquisition process sequence.

On the other hand, when there is an unexamined possible return address (step S2, Yes), the program analyzer examines whether there is a route reaching a command currently being executed using the result of analysis on the control flow at step S5 (step S6). As in FIG. 4, when there is no route reaching the command currently being executed (step S7, No), the program analyzer 12 determines that the possible return address is not a return address and returns the process to step S2. On the other hand, when there is a route reaching the command currently being executed (step S7, Yes), the program analyzer 12 determines that the possible return address is a return address and brings the process forward to step S8.

In the processing at step S8, as in FIG. 4, the pointer updater 13 updates the stack pointer RSP to a position in the stack area right after the position where there is the possible return address that is determine as the return address and updates the command pointer RIP to a value of the address that is determined as the return address. The pointer updater 13 checks whether the updated stack pointer has reached the bottom of the call stack (step S9) and, when the updated stack pointer has not reached the bottom (step S9, No), returns the process to step S2 and, when the updated stack pointer has reached the bottom of the call stack (step S9, Yes), ends the call stack acquisition process sequence.

As described above, in the call stack acquisition device 10 of the embodiment, the stack scanner 11 extracts, from a stack area of a thread whose call stack is to be acquired in a memory space of an application process, possible return addresses in a feasible region in the memory space each representing a command right after a function call command. The program analyzer 12 analyzes a control flow representing a flow of control configured by a branch in a function that is called by the function call command right before the command represented by each of the possible return addresses and, when there is a route reaching a command currently being executed in the control flow, determines that the possible return address is a return address and, when there is no route reaching the command currently being executed, determines that the possible return address is not the return address.

Thus, the call stack acquisition device 10 is able to avoid detecting, as a return address by error, a function pointer not establishing the relationship between a function represented by another return address, the caller and the called. Even when a value that was used as a return address in the past remains without being overwritten, it is possible to avoid detecting the value as the return address by error. Accordingly, it is possible to reproduce a call stack accurately.

The subject on which the call stack acquisition process is to be performed need not be limited to a program that enables acquisition of debug symbols, a program to be monitored under the circumstances where a monitoring program is introduced, etc. According to the call stack acquisition device 10 according to the embodiment, it is possible to reproduce a call stack accurately without restricting the range of application.

The call stack acquisition device 10 according to the embodiment is not limited to the technique using a stack pointer and a command pointer and preferably specifies the area of a stack area to be scanned and the last function that was executed before the call stack acquisition process. For example, a data structure representing a stack rea or execution context may be used.

EXAMPLE

Figure 6:
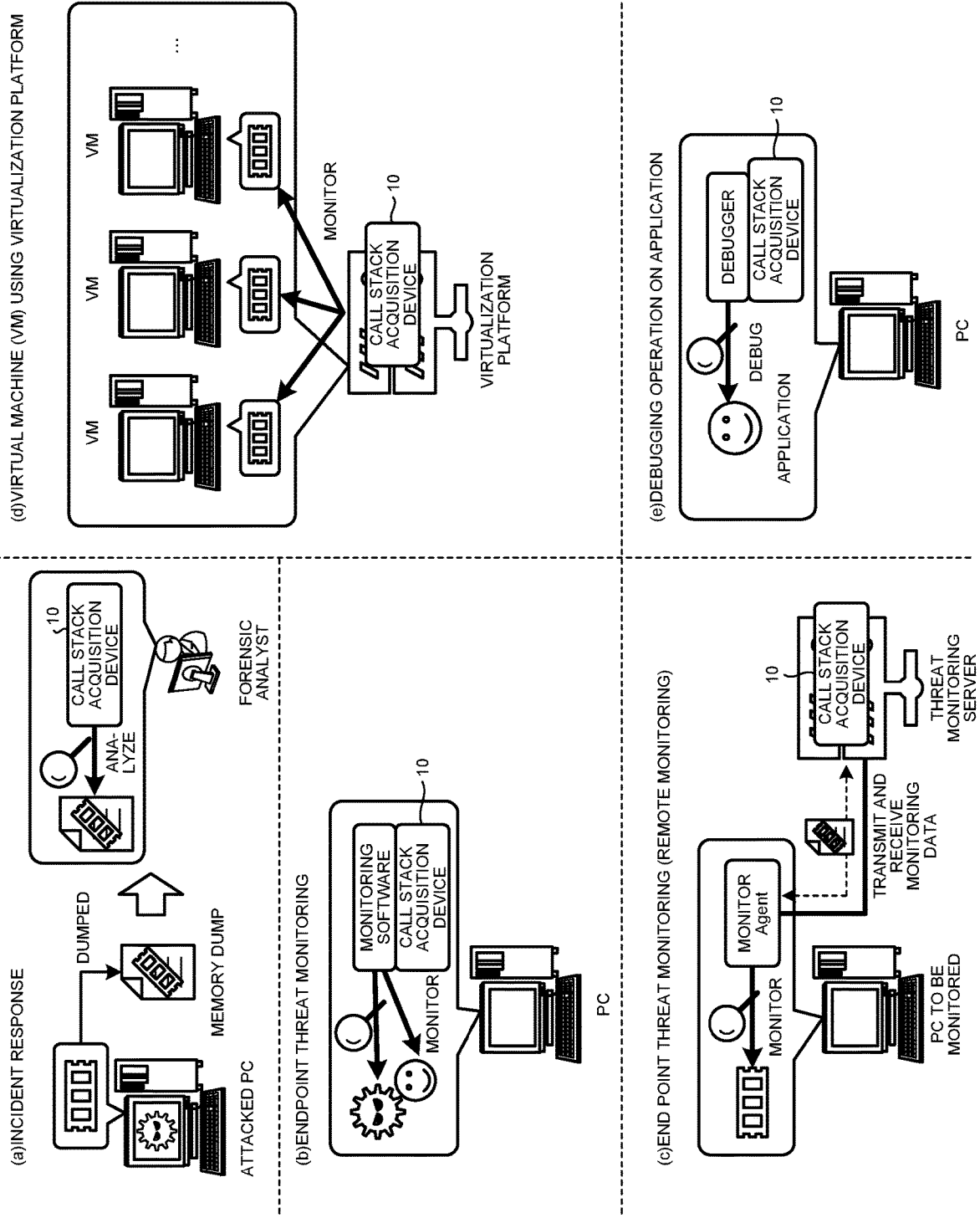
FIG. 6 is a diagram exemplifying examples of the call stack acquisition device.

FIG. 6 is a diagram exemplifying examples of the call stack acquisition device 10. For example, as illustrated in FIG. 6, the call stack acquisition device 10 may be used for an incident response. In this case, the call stack acquisition device 10 analyzes a memory dump of an attacked PC and acquires a call stack. By checking the content of the created call stack, a forensic analyst, or the like, is able to examine the damages of the attacked PC and measures and thus make a prompt incident response.

As illustrated in FIGS. 6(b) and 6(c), the call stack acquisition device 10 may be used to monitor threats to a PC (end point) to be monitored by a threat monitoring server. In this case, as illustrated in FIG. 6(b), the call stack acquisition device 10 analyzes the memory of the PC and acquires a call stack. By analyzing the acquired call stack, the monitoring software of the PC is able to monitor the operating status of the PC.

As illustrated in FIG. 6(c), the call stack acquisition device 10 may be implemented in a threat monitoring server and may be used to perform remote monitoring. In this case, when the threat monitoring server acquires monitoring data (memory dump) of the memory of a PC to be monitored that is monitored by a monitor Agent, the call stack acquisition device 10 analyzes the memory dump and acquires a call stack of an application running on the PC to be monitored. By analyzing the acquired call stack, the threat monitoring server is able to monitor the operating status of the PC to be monitored.

As illustrated n FIG. 6(d), the call stack acquisition device 10 may be used to monitor a virtual machine (VM) using a virtualization platform. In this case, the call stack acquisition device 10 is implemented in a computer serving as a virtualization platform. The computer serving as a virtualization platform monitors the memory of each VM that is configured in the computer and acquires a call stack of an application running on each VM as required. By analyzing the call stack of each VM, the computer serving as a virtualization platform is able to monitor the operating status of each VM.

Furthermore, as illustrated in FIG. 6(e), the call stack acquisition device 10 may be used for debugging operation on an application program. In this case, the call stack acquisition device 10 analyzes the memory and a memory dump of a program to be debugged and acquires a call stack. A debugger analyzes the call stack and thus enables an efficient debugging operation on a program having no debug symbol without requiring detailed execution monitoring.

Program

It is also possible to create a program obtained by writing the process that is executed by the call stack acquisition device 10 according to the embodiment in a computer executable language. In an embodiment, it is possible to implement the call stack acquisition device 10 by installing a call stack acquisition program to execute the above-described call stack acquisition process as package software or online software in a desired computer. For example, causing an information processing device to execute the above-described call stack acquisition program enables the information processing device to function as the call stack acquisition device 10. The information processing device herein covers desktop or laptop personal computers. The information processing device further covers mobile communication terminals, such as a smartphone, a mobile phone or a PHS (Personal Handyphone System), and slate terminals, such as a PDA (Personal Digital Assistants).

A terminal device that is used by a user may serve as a client and the call stack acquisition device 10 may be implemented as a server device that provides a service relating to the above-described call stack acquisition process to the client. For example, the call stack acquisition device 10 is implemented as a server device that provides a call stack acquisition process service that uses a virtual memory space, a stack pointer and a command pointer as inputs and outputs a call stack. In this case, the call stack acquisition device 10 may be implemented as a Web server or may be implemented as clouds that provide a service relating to the above-described call stack acquisition process by outsourcing. An exemplary computer that executes the call stack acquisition program that implements the same function as that of the call stack acquisition device 10 will be described below.

Figure 7:
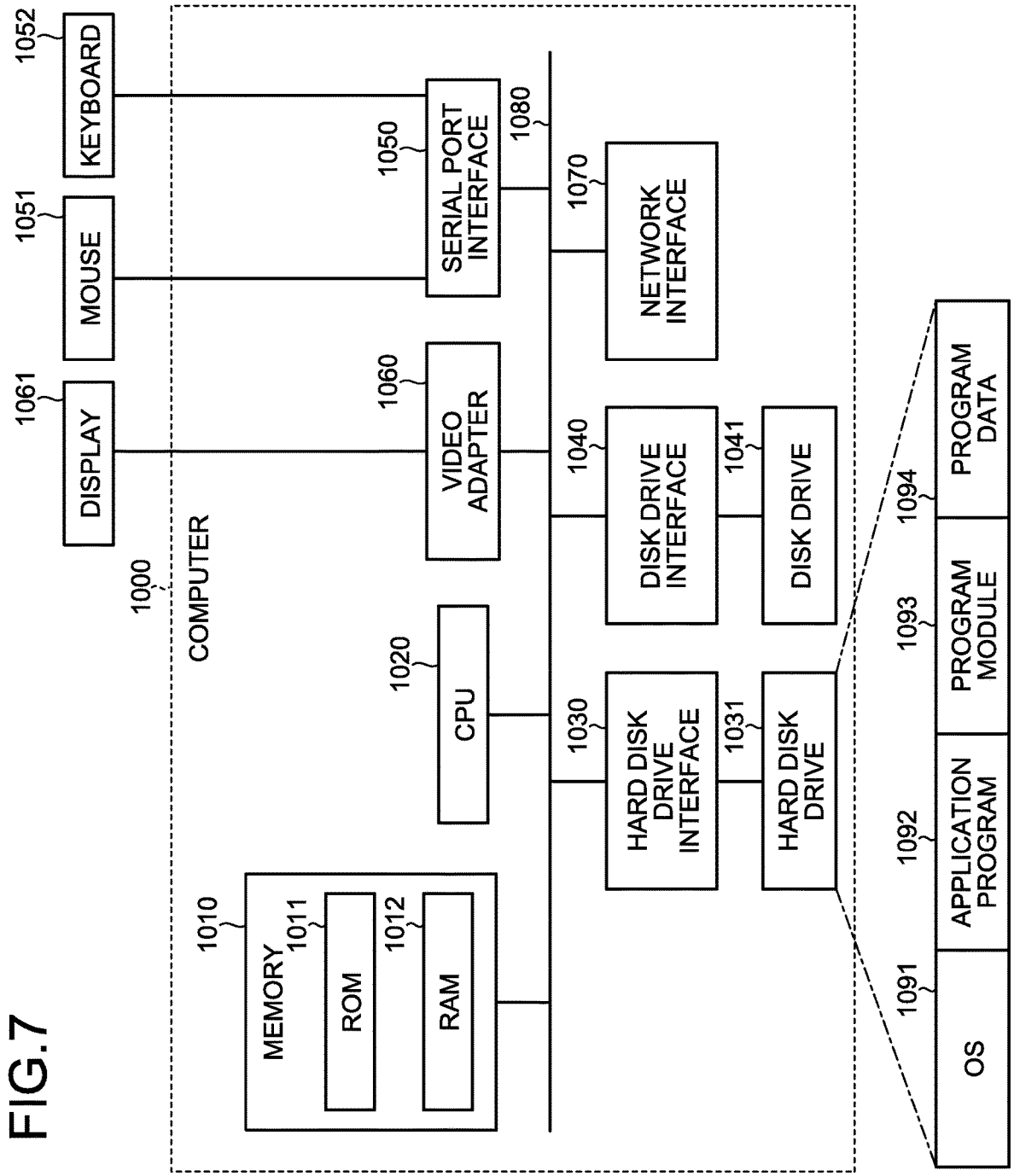
FIG. 7 is a diagram exemplifying a computer that executes a call stack acquisition program.

FIG. 7 is a diagram exemplifying a computer that executes the call stack acquisition program. A computer 1000, for example, includes a memory 1010, a CPU 1020, a hard disk drive interface 1030, a disk drive interface 1040, a serial port interface 1050, a video adapter 1060, and a network interface 1070. These components are connected with one another via a bus 1080.

The memory 1010 includes a ROM (Read Only Memory) 1011 and a RAM 1012. The ROM 1011 stores a boot program, such as a BIOS (Basic Input Output System). The hard disk drive interface 1030 is connected to a hard disk drive 1031. The disk drive interface 1040 is connected to a disk drive 1041. For example, a detachable storage medium, such as a magnetic disk or an optical disk, is inserted into the disk drive 1041. For example, a mouse 1051 and a keyboard 1052 are connected to the serial port interface 1050. For example, a display 1061 is connected to the video adapter 1060.

The hard disk drive 1031, for example, stores an OS 1091, an application program 1092, a program module 1093 and program data 1094.

The call stack acquisition program is stored in the hard disk drive 1031 as the program module 1093 in which instructions to be executed by the computer 1000 are written. Specifically, the program module 1093 in which each process to be executed by the call stack acquisition device 10 described in the above-described embodiment is stored in the hard disk drive 1031.

Data that is used for information processing enabled by the call stack acquisition program is stored as the program data 1094, for example, in the hard disk drive 1031. The CPU 1020 reads the program module 1093 and the program data 1094 that are stored in the hard disk drive 1031 to the RAM 1012 as required and executes each of the above-described steps.

The program module 1093 and the program data 1094 according to the call stack acquisition program are not limited to the case where the program module 1093 and the program data 1094 are stored in the hard disk drive 1031 and, for example, the program module 1093 and the program data 1094 may be stored in a detachable storage medium and read by the CPU 1020 via the disk drive 1041, or the like. Alternatively, the program module 1093 and the program data 1094 according to the call stack acquisition program may be stored in another computer that is connected via a network, such as a LAN (Local Area Network) or a WAN (Wide Area Network), and may be read by the CPU 1020 via the network interface 1070.

The embodiment to which the present invention made by the inventors has been described; however, the description and drawings forming part of the disclosure of the invention according to the embodiment do not limit the invention. In other words, other embodiments, examples and operational technologies implemented by those skilled in the art based on the embodiment are covered by the scope of the invention.

REFERENCE SIGNS LIST

10 CALL STACK ACQUISITION DEVICE
11 STACK SCANNER (EXTRACTOR)
12 PROGRAM ANALYZER (ANALYZER)
13 POINTER UPDATER (UPDATER)

The invention claimed is:

1. A call stack acquisition device configured to acquire, from a memory of a computer or a memory dump in which a status of the memory is saved, a call stack of a thread that is executing an application process running on the computer, the call stack acquisition device comprising:
   a memory; and
   a processor coupled to the memory and programmed to execute a process comprising:
   extracting, from a stack area of the thread whose call stack is to be acquired in a memory space of the application process, possible return addresses in a feasible region in the memory space each representing a command right after a function call command; and
   analyzing a control flow representing a flow of control configured by a branch in a function that is called by the function call command right before the command represented by each of the possible return addresses and, when there is a route reaching a command currently being executed in the control flow, determining that the possible return address is a return address and, when there is not the route, determining that the possible return address is not the return address, wherein
   the extracting includes receiving, as an input, a virtual memory space in which the thread whose call stack is to be created runs, and specifying the stack area, the virtual memory space including both a live memory of a running computer and the memory dump enabling reproduction of the virtual memory space,
   the analyzing receives a command pointer representing the command currently being executed as an input, and specifies the command currently being executed using the command pointer, the command currently being executed being a last command that the thread was executing before a call stack acquisition process, and
   the analyzing applies emulation execution to part or whole of the determined return address and a command that is present ahead the extracted possible return address.

2. The call stack acquisition device according to claim 1, wherein the extracting specifies the stack area using a stack pointer.

3. The call stack acquisition device according to claim 1, wherein the analyzing selects the possible return address in an ascending order in which the possible return address is close to a top of the stack area.

4. The call stack acquisition device according to claim 1, wherein the process further comprises updating, when the determining determines that the possible return address is a return address, such that a position right after a position where there is the possible return address that is determined as a return address is a position of the top of the stack area and an address that is determined as a return address is a position of the command currently being executed.

5. A call stack acquisition method that is executed by a call stack acquisition device configured to acquire, from a memory of a computer or a memory dump in which a status of the memory is saved, a call stack of a thread that is executing an application process running on the computer, the method comprising:
   extracting, from a stack area of the thread whose call stack is to be acquired in a memory space of the application process, possible return addresses in a feasible region in the memory space each representing a command right after a function call command; and
   analyzing a control flow representing a flow of control configured by a branch in a function that is called by the function call command right before the command represented by each of the possible return addresses and, when there is a route reaching a command currently being executed in the control flow, determining that the possible return address is a return address and, when there is not the route, determining that the possible return address is not the return address, wherein
   the extracting includes receiving, as an input, a virtual memory space in which the thread whose call stack is to be created runs, and specifying the stack area, the virtual memory space including both a live memory of a running computer and the memory dump enabling reproduction of the virtual memory space,
   the analyzing receives a command pointer representing the command currently being executed as an input, and specifies the command currently being executed using the command pointer, the command currently being executed being a last command that the thread was executing before a call stack acquisition process, and
   the analyzing applies emulation execution to part or whole of the determined return address and a command that is present ahead the extracted possible return address.

6. A non-transitory, computer-readable recording medium having stored a call stack acquisition program for acquiring, from a memory of a computer or a memory dump in which a status of the memory is saved, a call stack of a thread that is executing an application process running on the computer, the program causing a computer to execute:
   extracting, from a stack area of the thread whose call stack is to be acquired in a memory space of the application process, possible return addresses in a feasible region in the memory space each representing a command right after a function call command; and analyzing a control flow representing a flow of control configured by a branch in a function that is called by the function call command right before the command represented by each of the possible return addresses and, when there is a route reaching a command currently being executed in the control flow, determining that the possible return address is a return address and, when there is not the route, determining that the possible return address is not the return address, wherein the extracting includes receiving, as an input, a virtual memory space in which the thread whose call stack is to be created runs, and specifying the stack area, the virtual memory space including both a live memory of a running computer and the memory dump enabling reproduction of the virtual memory space, the analyzing receives a command pointer representing the command currently being executed as an input, and specifies the command currently being executed using the command pointer, the command currently being executed being a last command that the thread was executing before a call stack acquisition process, and the analyzing applies emulation execution to part or whole of the determined return address and a command that is present ahead the extracted possible return address.

\* \* \* \* \*